(12) United States Patent
Martinez

(10) Patent No.: US 7,694,130 B1
(45) Date of Patent: Apr. 6, 2010

(54) SYSTEM AND METHOD TO AUTHENTICATE A USER UTILIZING A TIME-VARYING AUXILIARY CODE

(76) Inventor: Michael Anthony Martinez, P.O. Box 4923, Albuquerque, NM (US) 87196

( * ) Notice: Subject to any disclaimer, the term of this patent is extended or adjusted under 35 U.S.C. 154(b) by 85 days.

(21) Appl. No.: 12/209,856

(22) Filed: Sep. 12, 2008

(51) Int. Cl.
H04L 29/06 (2006.01)

(52) U.S. Cl. .................. 713/155; 713/183; 713/184; 726/5

(58) Field of Classification Search .................. 713/155, 713/183, 184; 726/5
See application file for complete search history.

(56) References Cited

U.S. PATENT DOCUMENTS

| | | | | |
|---|---|---|---|---|
| 4,465,153 A * | 8/1984 | van de Pas et al. | ............ | 380/47 |
| 5,280,527 A * | 1/1994 | Gullman et al. | ............ | 713/184 |
| 5,367,572 A | 11/1994 | Weiss | | |
| 5,490,077 A * | 2/1996 | Freytag | ............ | 705/405 |
| 5,602,743 A * | 2/1997 | Freytag | ............ | 705/408 |
| 5,657,388 A * | 8/1997 | Weiss | ............ | 713/185 |
| 5,886,331 A * | 3/1999 | Lyons, Jr. | ............ | 235/61 B |
| 5,889,861 A * | 3/1999 | Ohashi et al. | ............ | 380/247 |
| 5,966,753 A * | 10/1999 | Gauthier et al. | ............ | 4/632 |
| 6,091,759 A * | 7/2000 | Rotstein et al. | ............ | 375/140 |
| 6,195,588 B1 * | 2/2001 | Gauthier et al. | ............ | 700/11 |
| 6,549,816 B2 * | 4/2003 | Gauthier et al. | ............ | 700/32 |
| 6,557,104 B2 | 4/2003 | Vu | | |
| 6,657,535 B1 * | 12/2003 | Magbie et al. | ............ | 340/5.31 |
| 6,701,194 B2 * | 3/2004 | Gauthier et al. | ............ | 700/39 |
| 6,820,808 B2 * | 11/2004 | Mehler | ............ | 235/454 |
| 6,842,105 B1 | 1/2005 | Henderson | | |
| 7,308,250 B2 * | 12/2007 | Khare et al. | ............ | 455/411 |
| 7,356,837 B2 * | 4/2008 | Asghari-Kamrani et al. | ... | 726/5 |
| 7,363,494 B2 | 4/2008 | Brainard | | |
| 7,372,839 B2 * | 5/2008 | Relan et al. | ............ | 370/338 |
| 7,380,708 B1 | 6/2008 | Kiliccote | | |
| 2002/0116450 A1 * | 8/2002 | Wei et al. | ............ | 709/203 |
| 2002/0123359 A1 * | 9/2002 | Wei et al. | ............ | 455/466 |
| 2002/0169988 A1 * | 11/2002 | Vandergeest et al. | ......... | 713/201 |
| 2002/0179709 A1 * | 12/2002 | Mehler | ............ | 235/454 |
| 2003/0093161 A1 * | 5/2003 | Gauthier et al. | ............ | 700/39 |
| 2004/0103287 A1 * | 5/2004 | Newby et al. | ............ | 713/184 |
| 2005/0066049 A1 * | 3/2005 | Clevy et al. | ............ | 709/231 |
| 2005/0198379 A1 * | 9/2005 | Panasyuk et al. | ............ | 709/239 |

(Continued)

FOREIGN PATENT DOCUMENTS

EP 1445917 6/2004

OTHER PUBLICATIONS

InCard Technologies website, http://www.incard.com/products.html, see attached IDS letter, Jul. 17, 2008.

*Primary Examiner*—David Garcia Cervetti
(74) *Attorney, Agent, or Firm*—Yorgos Marinakis

(57) ABSTRACT

A system and method to authenticate a user utilizing a time-varying auxiliary code. The code may be appended to a fixed password, but that is not required. The code is generated by a central electronic authentication system. The user retrieves it manually using a fungible communications device such as a telephone or a computer connected to the Internet. The user must learn the code because he inputs it manually, thereby authenticating himself. The present invention performs the same function as inventions with tokens, that is, it provides an extension to the PIN or password, but it eliminates the token and the synchronization required with such a token.

20 Claims, 3 Drawing Sheets

U.S. PATENT DOCUMENTS

| | | | |
|---|---|---|---|
| 2005/0213519 A1* | 9/2005 | Relan et al. | 370/277 |
| 2006/0156385 A1* | 7/2006 | Chiviendacz et al. | 726/2 |
| 2007/0136800 A1* | 6/2007 | Chan et al. | 726/10 |
| 2007/0220100 A1* | 9/2007 | Rosenberg | 709/206 |
| 2008/0099552 A1* | 5/2008 | Grillion | 235/380 |
| 2008/0177668 A1* | 7/2008 | Delean | 705/76 |
| 2008/0241002 A1* | 10/2008 | Weber et al. | 422/109 |
| 2008/0276312 A1* | 11/2008 | Kawai et al. | 726/18 |

* cited by examiner identifying the user by creating a user identifier and a time-varying auxiliary code, at least the code provided by a server in a central electronic authentication system;

↓ storing the user identifier with the code in an electronic database in the central electronic authentication system;

↓ providing a communications interface through which the user manually retrieves the code from the central electronic authentication system using a fungible communications device;

↓ providing an electronic user interface to present the user with a means to input manually at least his code to the central electronic authentication system;

↓ the user inputting manually at least his code to the central electronic authentication system;

↓ conveying the user-input code from the user interface to the authentication system, wherein circuitry in the authentication server in the central electronic authentication system authenticates the user if the user input code matches the stored code.

FIG. 1 identifying the user by creating a user identifier, an authentication key in the form of a fixed password, and a time-varying auxiliary code, at least the code provided by the central electronic authentication system;

↓ storing the user identifier and the authentication key in the form of a fixed password with the code in the central electronic authentication system;

↓ providing a communications interface through which the user manually retrieves the code from the central electronic authentication system using a fungible communications device;

↓ providing an electronic user interface to present the user with a means to input at least his fixed password and his code to the central electronic authentication system;

↓ the user inputting manually at least his code to the central electronic authentication system;

↓ conveying the user-input fixed password and code through the user interface to the central electronic authentication system, wherein circuitry in the central electronic authentication system authenticates the user if the user input fixed password and code matches the stored code.

FIG. 2

SYSTEM AND METHOD TO AUTHENTICATE A USER UTILIZING A TIME-VARYING AUXILIARY CODE

CROSS-REFERENCE TO RELATED APPLICATIONS

None.

STATEMENTS REGARDING FEDERALLY SPONSORED RESEARCH AND DEVELOPMENT

Not applicable.

BACKGROUND

The present invention satisfies the need of authenticating a user without the use of tokens or biometrics.

Information relevant to attempts to address this problem can be found in U.S. Pat. Nos. 5,367,572; 6,557,104; 6,842,105; 7,363,494; and 7,380,708; and EP1445917; which are not admitted to be prior art with respect to the present invention by its mention in this Background Section. However, it is desirable to have better apparatuses and/or methods than what is disclosed in the identified references. Relevant fields of art include 235/382, 705/72, 713/183 and 726/17, 21 and 28.

There are three types or "factors" of information used to authenticate a user: what you know, what you have, and who you are. What you know includes passwords. What you have includes tokens, which may produce passwords. Who you are includes biometrics. Authorities are now recommending the use of "multifactor authentication." In this type of process, measures from more than one type of authentication are combined. For example, a token such as an ATM card is used with a password or PIN. The present invention in its simplest form is a single-factor system and method. It uses passwords only, falling into the type "what you know." However, it can also function with or approximate a multifactor system. It can function with ATM cards and other cards, replacing or supplementing their passwords. In addition, the time-varying code, by its variable nature differs from fixed passwords and PINS, such that it approximates the function of a token.

One type of password-only system uses one-time passwords. One-time passwords are typically produced by or stored on tokens, such as with InCard Technologies' DisplayCard. DisplayCard is a credit card that contains electronic circuitry and that sports a button and a display. When the card holder—or anyone else—pushes the button, the card displays a one-time password. The user submits the one-time password with his purchase approval, and the bank compares it with what they are expecting. The system does nothing to ensure that the user is the bona fide card holder. It ensures only that the card is in a user's possession. The present invention does not utilize one-time passwords.

Other types of password-only systems utilize tokens that provide what are effectively one-time passwords, often to be used in conjunction with a PIN. As discussed in U.S. Pat. No. 7,380,708, there exists a "prior art system" that uses a token synchronized with a supplier's hardware and software. The token produces a new password every sixty seconds, to which the user appends his Personal Identification Number (PIN). The token's password is hidden and the appending is automatic. The PIN is not an auxiliary code, and it is not time varying. It is simply a PIN. This system also does nothing to ensure that the user is the bona fide card holder. The present invention does not utilize tokens. The present invention utilizes a code that is generated not on a local token but on a remote server. Tokens need to be synchronized with the authentication server. The present invention requires no such synchronization, because it requires no token. The present invention performs the same function as inventions with tokens, that is, it provides an extension to the PIN or password, but it eliminates the token and the synchronization required with such a token.

The present invention also requires the user to manually retrieve the auxiliary code, because he enters it manually when authenticating himself.

The user of the present invention may retrieve his auxiliary code with a fungible communications device, that is, through any telephone, or any computer connected to the Internet. In any case he retrieves the code from the central electronic authentication system, not from a local device or token in his possession. The code is generated at the central electronic authentication system, not at a local device or token in his possession.

The present invention authenticates the user at a central electronic authentication system, not at the user interface.

U.S. Pat. No. 6,842,105 discloses a lockbox that can be programmed to require, in addition to the standard key identifier code, a four-digit permission code. The four-digit permission code does not vary with time. In analogy with the present invention, the four-digit permission code is an auxiliary code. Rather than a fungible communications device, the user needs a proprietary electronic device programmed with his key identifier code to communicate with the lockbox. The key identifier code is transmitted via an infrared link to the lockbox. The user types the four-digit permission code into the proprietary device.

U.S. Pat. No. 5,367,572 utilizes a device in possession of the user to generate automatically a one-time code, which is then mixed automatically with the PIN. The user does not see the one-time code. The verification computer then either strips the one-time code from the PIN, or combines them, to authenticate the user. The point of the one-time code is to mask the PIN from eavesdroppers. In analogy with the present invention, the one-time code is an auxiliary code.

U.S. Pat. No. 6,557,104 duplicates the function of a smart card but it eliminates the smart card. The invention stores a cryptographic key on a removable data storage device or "token." The storage device is then connected to a computer by the user. The key is read by the computer only when the computer is operating in a secure mode, that is, in which it cannot be interrupted by other interrupts. The computer then reads the key into secure memory. The user may then be prompted to enter a PIN to unlock the key. The user may now request cryptographic services as if the smart card were attached to the computer. The embodiment with the PIN ensures that the user is bona fide. The system still requires the token, that is, the removable data storage device, albeit only to load the key. The key is not time-varying. The user does not see the key, which is an encrypted digital key and thus is not susceptible of manual typed entry by a user. In analogy with the present invention, the key is an auxiliary code.

U.S. Pat. No. 7,363,494 utilizes a user authentication device in possession of the user loaded with a program that computes an authentication code. The program takes as input a secret such as a key, a dynamic value, a PIN value, a generation value, and a verification identification value, and combines them. Except for the PIN, these values are automatically provided and are hidden from the user. The dynamic value is constant for a given time interval, but the generation value changes with generation attempts within the time interval. The time intervals discussed in the embodiments are a minute and an hour. In analogy with the present invention, the dynamic value is an auxiliary code. The point of the invention is to mask the PIN against eavesdroppers.

U.S. Pat. No. 7,380,708 utilizes a portable secure device, that is, a token, to scan an image or video. The device extracts authentication information from the image or video, which the user may then key in to gain access to the website etc. In analogy with the present invention, the authentication information is an auxiliary code.

In EP1445917 the user supplies beside his regular username and password an additional, randomly generated password (one-time code), which is sent to his mobile phone number by the identification system in the form of an SMS message after the identification systems receives the regular username and password from the user. The code is generated and authenticated by a central electronic authentication system, it is manually communicated to the user using a fungible communications device, and it is manually input by the user. However, the code is not manually retrieved by the user, it is sent to the user. Moreover, the code is sent to the user during the transaction; the user does not possess the code prior to the transaction. That means that the user has to wait, possibly with a line of people behind him, for a telephone call before he can finish the transaction; he has to have a cell phone; and he has to have cell phone service, which he might not have for example if he is far from home or in a foreign country. The invention also requires two electronic transactions, the first with his regular username password and the second with the new one-time password.

SUMMARY

The embodiments of the present invention comprise a system and method to authenticate a user utilizing a time-varying auxiliary code. The code may be appended to a fixed password, but that is not required. The code is generated by a central electronic authentication system. The user retrieves it manually from the central authentication system using a fungible communications device such as a telephone or a computer connected to the Internet. The user must learn the code because he inputs it manually, thereby authenticating himself. The present invention performs the same function as inventions with tokens, that is, it provides an extension to the PIN or password, but it eliminates the token and the synchronization required with such a token.

The invention includes a system for authenticating a user, comprising: an identification subsystem, comprising a user identifier and a time-varying auxiliary code, at least the code provided by a central electronic authentication system, both the identifier and the code stored in an electronic database in the authentication system; a communications interface through which the user manually retrieves the code from the central electronic authentication system using a fungible communications device; an electronic user interface that presents the user with a means to input manually at least his code to the central electronic authentication system; circuitry in the central electronic authentication system to i) compare the user input conveyed to the authentication system through the user interface with the stored information, and ii) to authenticate the user if the user input code matches the stored code.

In an alternative embodiment, in the system the identification subsystem further comprises a fixed password, stored in an electronic database in the central electronic authentication system; the circuitry in the authentication system further comprises circuitry to i) compare the user input conveyed to the authentication system through the user interface with the stored information where the user input includes at least his fixed password and his code, and ii) to authenticate the user if the user input password and code match the stored password and code; and an electronic user interface that presents the user with a means to input manually at least his code and his password to the central electronic authentication system. In this embodiment, the user identifier includes debit card numbers and ATM card numbers.

The invention also includes a method for authenticating a user, comprising: identifying the user by creating a user identifier and a time-varying auxiliary code, at least the code provided by a server in a central electronic authentication system; storing the user identifier with the code in an electronic database in the central electronic authentication system; providing a communications interface through which the user manually retrieves the code from the central electronic authentication system using a fungible communications device; providing an electronic user interface to present the user with a means to input manually at least his code to the central electronic authentication system; the user manually inputting at least his code to the central electronic authentication system; conveying the user-input code from the user interface to the authentication system, wherein circuitry in the central electronic authentication system authenticates the user if the user input code matches the stored code.

In an alternative embodiment of the method, the identifying the user step further comprises creating an authentication key in the form of a fixed password; the storing the user identifier step further comprises storing the authentication key in the form of a fixed password with the daily auxiliary code in the electronic database in the authentication system; the providing a user interface step further comprises presenting the user with a means to input at least his password with his code; and the conveying the user input step further comprises conveying the user-input password with the code through the user interface to the authentication system, wherein circuitry in the authentication system authenticates the user if the user input password and code match the stored password and code.

Some user interfaces are the keypad of a terminal, a computer connected to the Internet, and a telephone.

Some fungible communications devices are computers connected to the Internet, and touch-tone telephones.

Some user identifiers are credit card numbers, debit card numbers, ATM card numbers, cashier's check numbers, bank account numbers, and prescription numbers.

In the preferred embodiment, the time-varying code changes every twenty-four hours.

The user learns his code in any of several ways. He logs into a computer account. He telephones a service that either requires a PIN or remembers his telephone number. He receives an automated telephone call. He requests it in person. In any case he must learn it, because he inputs it manually into the authentication system. After learning his code, he can use it in several ways, as exemplified in the following examples.

Example: a daily "PIN plus four" for an ATM card. You go to an ATM to withdraw cash. Into the keypad you enter your PIN followed by your "plus four" for the day, which code was issued by or through or on behalf of your bank. This example should not be interpreted as limiting the code to four digits or the time variation to twenty-four hours.

Example: a daily CCV code for a credit card. You make a credit card purchase. When you sign the slip or the machine, you also enter into a keypad your "plus four" for the day, which code was issued by or through or on behalf of your credit card provider. This example should not be interpreted as limiting the code to four digits or the time variation to twenty-four hours.

Example: a daily PIN for a check. You write a check at a retailer. The retailer provides you with a terminal with a keypad, into which you enter your "plus four" for the day, which code was issued by or through or on behalf of your bank. This example should not be interpreted as limiting the code to four digits or the time variation to twenty-four hours.

Example: a daily PIN for a debit card. You make a debit card purchase at a retailer. After you enter your PIN into the terminal keypad, you enter your "plus four" for the day, which code was issued by or through or on behalf of your bank. This example should not be interpreted as limiting the code to four digits or the time variation to twenty-four hours.

Example: a daily PIN for a prescription. When you pay for your prescription, to authenticate yourself to the pharmacy you enter into a terminal keypad your "plus four" for the day, which code was issued by or through or on behalf of the pharmacy or your HMO. This example should not be interpreted as limiting the code to four digits or the time variation to twenty-four hours.

DRAWINGS

These and other features, aspects and advantages of the embodiments of the apparatus and/or methods will become better understood with reference to the following description, appended claims and accompanying drawings where:

FIG. 1 shows a flowchart of the method;

FIG. 2 shows a flowchart of the method using a fixed password; and

Figure 3:
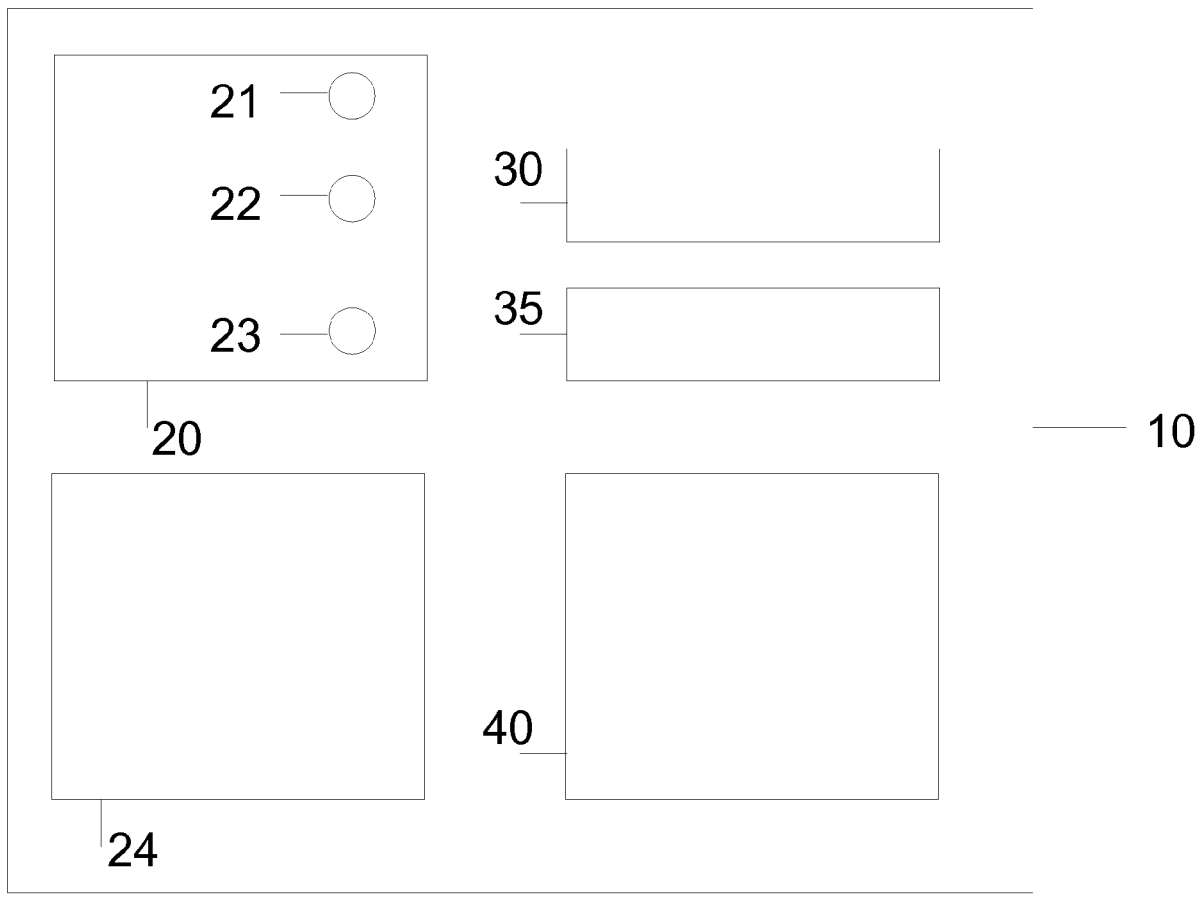
FIG. 3 shows a block diagram of the system.

REFERENCE NUMERALS FOR DRAWINGS 10 a system for authenticating a user;
20 an identification subsystem;
21 a user identifier;
22 a fixed password;
23 a time-varying auxiliary code;
24 electronic database;
30 an electronic user interface;
35 an interface for a fungible communications device; and
40 circuitry.

DESCRIPTION

Fixed password includes manually changeable passwords that are not automatically periodically time-varying. Manually retrieves the code means that the user must visually or auditorily inspect the code, in contrast to downloaded it blindly to a token. Manually inputs the code means that the user must type it in to a keyboard of some kind. A central electronic authentication subsystem is a server, where the various user input terminals are clients. A time-varying auxiliary code is an unpredictable code.

FIG. 1 shows a flowchart of the method, comprising: identifying the user by creating a user identifier and a time-varying auxiliary code, at least the code provided by a server in a central electronic authentication system; storing the user identifier with the code in an electronic database in the central electronic authentication system; providing a communications interface through which the user manually retrieves the code from the central electronic authentication system using a fungible communications device; providing an electronic user interface to present the user with a means to input manually at least his code to the central electronic authentication system; the user manually inputting at least his code to the central electronic authentication system; conveying the user-input code from the user interface to the authentication system, wherein circuitry in the central electronic authentication system authenticates the user if the user input code matches the stored code.

FIG. 2 shows a flowchart of the best mode of the method, using a fixed password in combination with the time-varying code. Here the identifying the user step further comprises creating an authentication key in the form of a fixed password; the storing the user identifier step further comprises storing the authentication key in the form of a fixed password with the code in the electronic database in the central electronic authentication system; the providing a user interface step further comprises presenting the user with a means to input at least his password with his code; and the conveying the user input step further comprises conveying the user-input password with the code through the user interface to the authentication system, wherein circuitry in the authentication system authenticates the user if the user input password and code match the stored password and code.

FIG. 3 shows a system for authenticating a financial transaction 10, comprising an identification subsystem 20, a user identifier 21, a fixed password 22, a daily auxiliary code 23, an electronic database 24, an electronic user interface 30, an interface for a fungible communications device 35, and circuitry 40. The circuitry in the central electronic authentication system has two purposes: to i) compare the user input conveyed to the authentication system through the user interface with the stored information, and ii) to authenticate the user if the user input code matches the stored code. For example a user at a POS wants to pay with his debit card. To authorize payment he punches in his PIN followed by his "plus four" for the day.

The fixed password 22 or PIN is not used in every embodiment. For example a user at a POS wants to pay with his credit card. These do not have PIN's unless you are taking cash from the account. They do use CCV's, which are not necessarily PIN's, and in any case they are not time-varying. After swiping his card and signing to authorize payment, the user inputs his "plus four" for the day. The credit card company authorizes the payment by comparing the input plus four with the expected plus four.

In an alternate embodiment, a text string is sent to us matching some piece of information agreed upon by the customer, such as the account number or credit card number. A hashing encryption scheme in conjunction with the date is applied to that text string to produce a 4 digit number.

In an alternate embodiment, the auxiliary code is constructed by sampling without replacement to minimize the chances of duplicate auxiliary codes. For example, if the code is four digits long, there are 9999 possibilities. Once a particular four-digit string has been selected, it is removed from the pool until all 9999 possibilities have been used.

Some advantages of the embodiments of the apparatus were previously enumerated in the Summary section. Every advantageous feature does not need to be incorporated into every embodiment of the apparatus and/or methods.

Although these versions of the invention have been described in considerable detail, other versions are possible. Therefore, the spirit and scope of the appended claims should not be limited to the description of the versions contained therein.

I claim:

1. A method to authenticate a user, comprising:
A. identifying the user by creating a user identifier and a time-varying auxiliary code, at least the code provided by a server in a central electronic authentication system;

B. storing the user identifier with the code in an electronic database in the central electronic authentication system;
C. providing a communications interface through which the user manually retrieves the code from the central electronic authentication system using a fungible communications device, the user retrieving the code prior to his initiation of a transaction, the code not being a one-time password;
D. providing an electronic user interface to present the user with a means to input manually at least his code to the central electronic authentication system;
E. the user manually inputting at least his code to the central electronic authentication system;
F. conveying the user-input code from the user interface to the central electronic authentication system, wherein circuitry in the authentication server in the central electronic authentication system authenticates the user if the user input code matches the stored code.

2. The method of claim 1, wherein said electronic user interface is an electronic input device selected from the group consisting of a keypad of a terminal, a computer, and a touch-tone telephone.

3. The method of claim 1, wherein said fungible communications device is an electronic communications device selected from the group consisting of computers connected to the Internet, and touch-tone telephones.

4. The method of claim 1, wherein said user identifier is selected from the group consisting of debit card numbers, ATM card numbers, and credit card numbers.

5. The method of claim 1, wherein said user identifier is a cashier's check number.

6. The method of claim 1, wherein said user identifier is a bank account number.

7. The method of claim 1, wherein said user identifier is a prescription number.

8. The method of claim 1, wherein:
A. the identifying the user step further comprises creating an authentication key in the form of a fixed password;
B. the storing the user identifier step further comprises storing the authentication key in the form of a fixed password with code in an electronic database in the authentication system;
C. the providing a user interface step further comprises presenting the user with a means to input manually at least his password with his code;
D. the manually inputting step further comprises manually inputting his password; and
E. the conveying the user input step further comprises conveying the user-input password with the code through the user interface to the authentication system, wherein circuitry in the authentication system authenticates the user if the user input password and code match the stored password and code.

9. The method of claim 8, wherein said electronic user interface is an electronic input device selected from the group consisting of a keypad of a terminal, a computer, and a touch-tone telephone.

10. The method of claim 1, wherein said time-varying code changes every twenty-four hours.

11. A system for authenticating a user, comprising:
A. an identification subsystem, comprising a user identifier and a time-varying auxiliary code, at least the code provided by a central electronic authentication system, both the identifier and the code stored in an electronic database in the authentication system;
B. a communications interface through which the user manually retrieves the code using a fungible communications device, the user retrieving the code prior to his initiation of a transaction, the code not being a one-time password;
C. an electronic user interface that presents the user with a means to input manually at least his code to the central electronic authentication system;
D. circuitry in the central electronic authentication system to i) compare the user input conveyed to the authentication system through the user interface with the stored information, and ii) to authenticate the user if the user input code matches the stored code.

12. The system of claim 11, wherein said user interface is an electronic input device selected from the group consisting of a keypad of a terminal, a computer, and a touch-tone telephone.

13. The system of claim 11, wherein said fungible communications device is an electronic communications device selected from the group consisting of a computers connected to the Internet, and touch-tone telephones.

14. The system of claim 11, wherein said user identifier is selected from the group consisting of debit card numbers, ATM card numbers, and credit card numbers.

15. The system of claim 11, wherein said user identifier is a cashier's check number.

16. The system of claim 11, wherein said user identifier is a bank account number.

17. The method of claim 11, wherein said user identifier is a prescription number.

18. The system of claim 11, wherein:
A. the identification subsystem further comprises a fixed password, stored in the authentication system;
B. the circuitry in the authentication system further comprises circuitry to i) compare the user input conveyed to the authentication system through the user interface with the stored information where the user input includes at least his fixed password and his code, and ii) to authenticate the user if the user input password and code match the stored password and code; and
C. an electronic user interface that presents the user with a means to input manually at least his code and his password to the central electronic authentication system.

19. The system of claim 18, wherein said user interface is an electronic input device selected from the group consisting of a keypad of a terminal, a computer, and a touch-tone telephone.

20. The system of claim 11, wherein said time-varying code changes every twenty-four hours.

* * * * *